No. 829,346.
PATENTED AUG. 21, 1906.
I. G. MITCHELL.
PUMPING APPARATUS.
APPLICATION FILED JUNE 16, 1905.
3 SHEETS—SHEET 3.
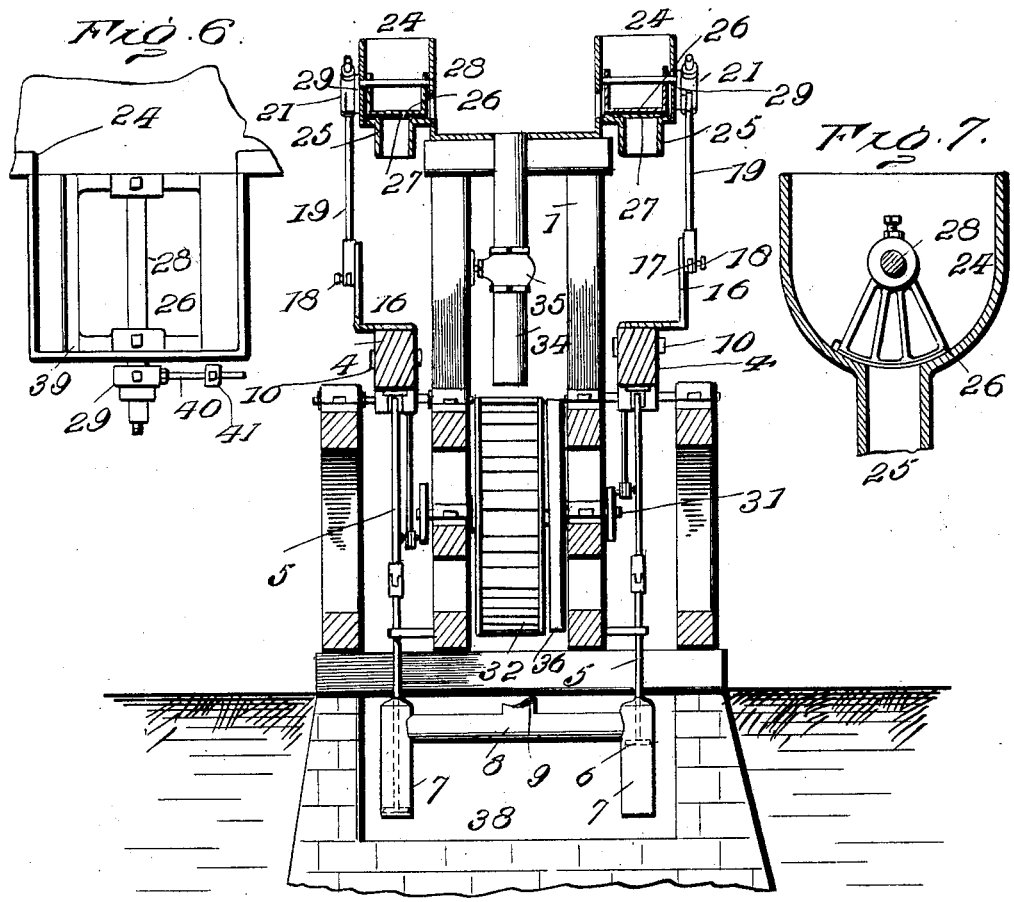
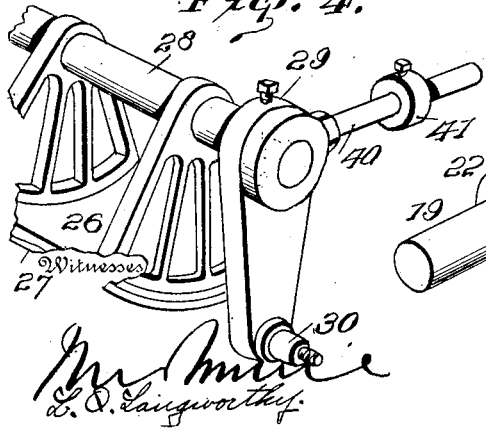
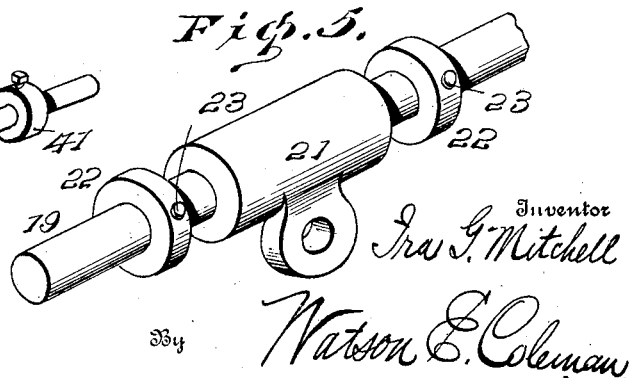

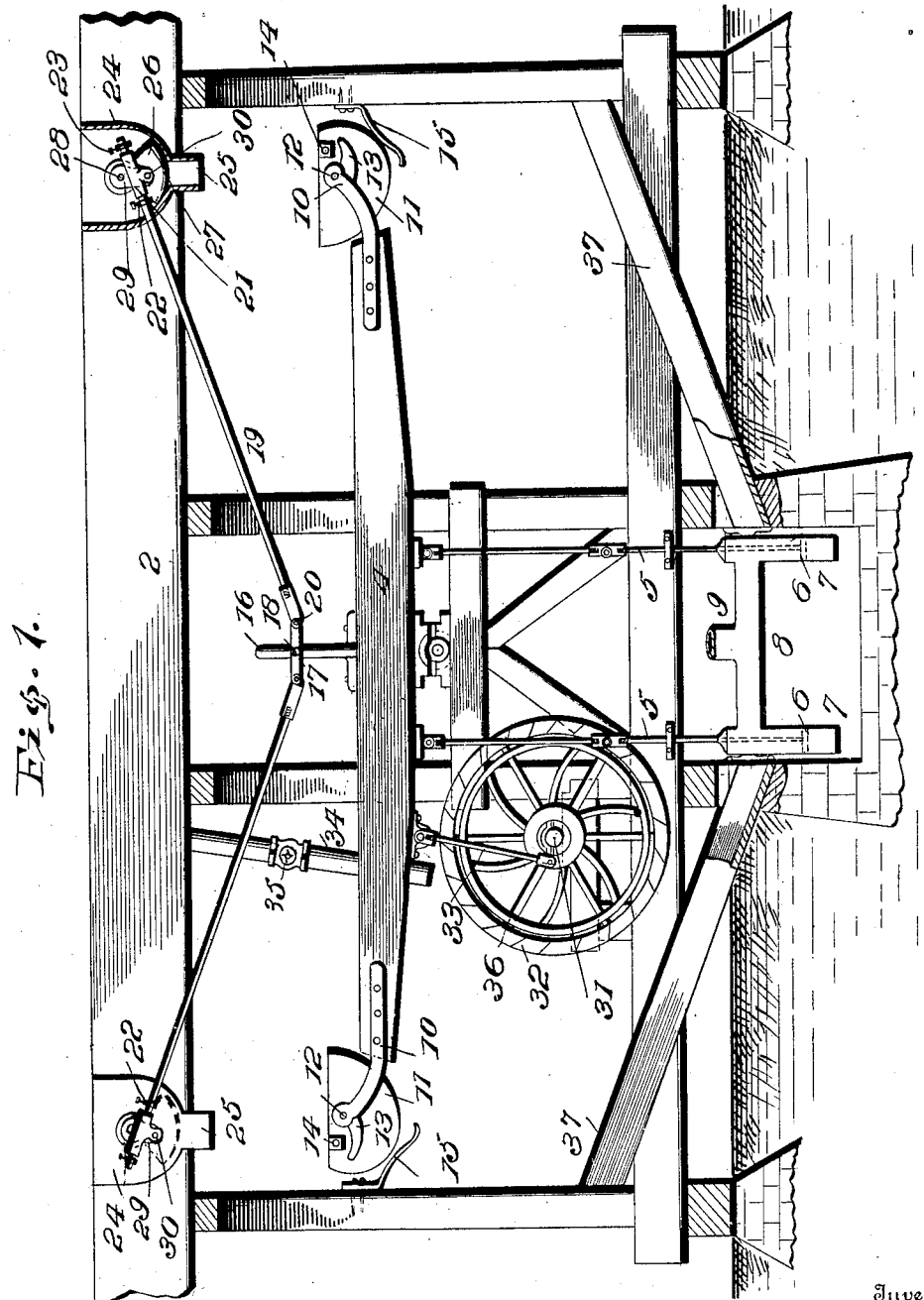

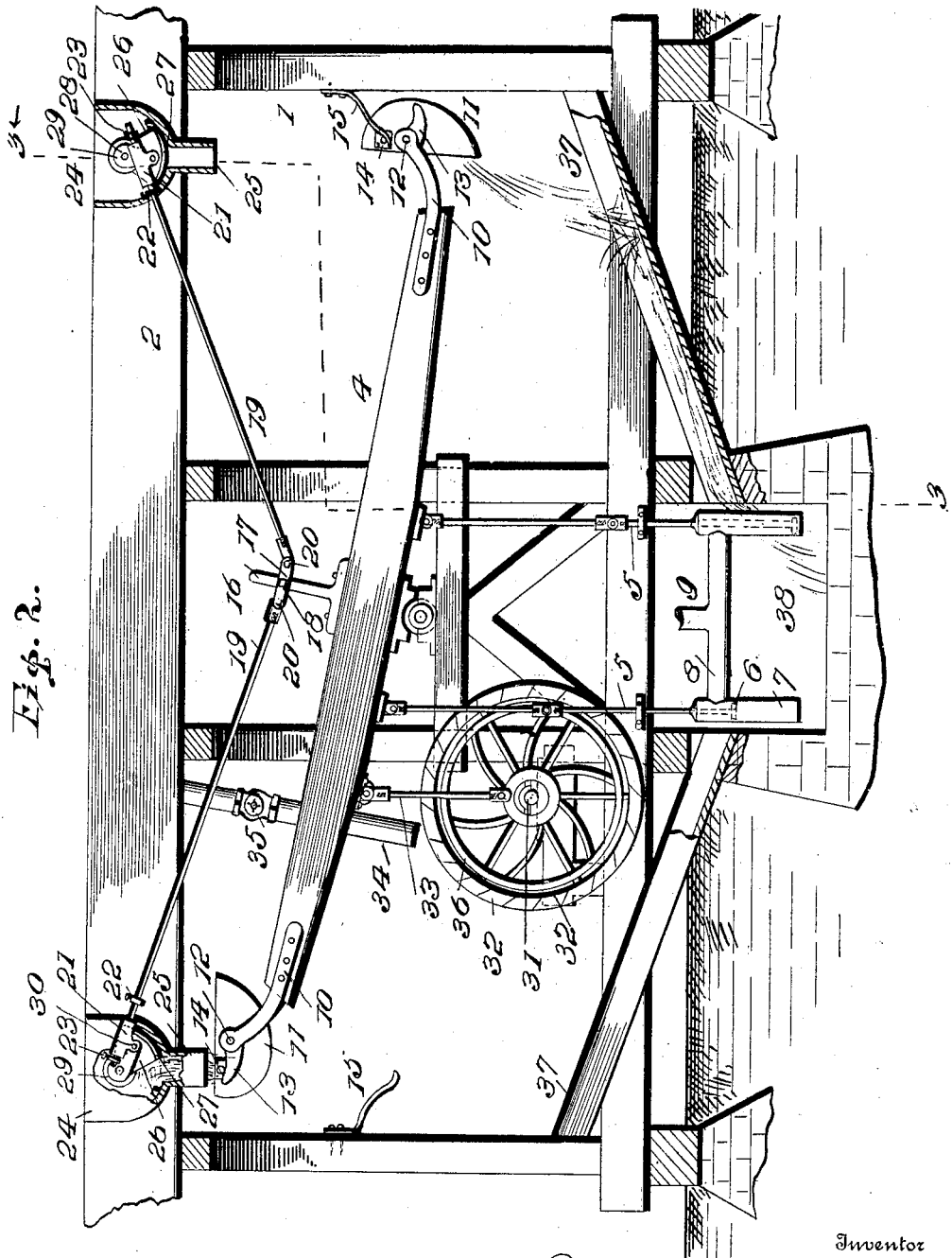

UNITED STATES PATENT OFFICE.

IRA G. MITCHELL, OF MEEKER, COLORADO, ASSIGNOR, BY DIRECT AND MESNE ASSIGNMENTS, TO THE MITCHELL MANUFACTURING AND IRRIGATION COMPANY, A CORPORATION OF COLORADO.

PUMPING APPARATUS.

No. 829,346.     Specification of Letters Patent.     Patented Aug. 21, 1906.

Application filed June 16, 1905. Serial No. 265,539.

*To all whom it may concern:*

Be it known that I, IRA G. MITCHELL, a citizen of the United States, residing at Meeker, in the county of Rio Blanco and State of Colorado, have invented certain new and useful Improvements in Pumping Apparatus, of which the following is a specification, reference being had therein to the accompanying drawings.

My invention relates to irrigation-pumps, and has for its objects the provision of means for the utilization of an available comparatively large quantity of water to elevate a small proportion of its mass to a greater height, whereby large areas of elevated arid land which are now without practicable means of irrigation may be reclaimed and rendered fertile at a small initial outlay and an inconsiderable cost of maintenance.

I accomplish this object by means of force-pumps driven by water-power and wholly automatic in action, the details of construction and operation of which will be hereinafter more fully described and claimed in connection with the accompanying drawings, in which—

Figure 1 is a side elevation with the motor in equilibrium. Fig. 2 is a similar view at the end of a stroke. Fig. 3 is a vertical cross-section on the line 3 3 of Fig. 2. Fig. 4 is a perspective view of one of the crank-arms and showing a section of one of the valves. Fig. 5 is a detail view of one end of one of the valve-operating rods. Fig. 6 is a plan view of one of the valves, and Fig. 7 is a view of the valve-box with the end removed.

In the embodiment of the invention shown a suitable framework 1, arranged beneath a water-supply flume 2, serves as a support for a rock-shaft 3, upon which is balanced a walking-beam 4, the two arms of which are connected near its bearing by rods 5 with the pump-pistons 6, working in cylinders 7, the upper portion of the cylinders communicating by pipes 8 with the discharge-pipe 9, leading to the elevated land to be irrigated.

At each extremity of the beam 4 in arms 10 is swung a water-bucket 11 by pintles 12, ears 13 projecting beyond the pintles alongside the bucket. Lugs 14 extend outwardly from the sides of the buckets and normally rest upon the ears 13, whereby the buckets are maintained in a horizontal position, the rear of the buckets being slightly the heavier. Spring-trips 15 are secured to the frame in a position to engage the lugs 14 to tilt the bucket as the beam end descends.

Above the rock-shaft 3 an arm 16 extends upwardly at right angles from the beam and has secured thereon a cross-bar 17, adjustable by means of the set-screw 18, to the ends of which cross-bar connecting-rods 19 are pivoted at 20. The other end of each rod 19 passes through a sleeve 21, within which it has longitudinal play limited by the collars 22, secured at each end of the sleeve to the rod 19 by set-screws 23.

Directly above each bucket 11 and at the side of the flume 2 is arranged a valve-box 24, receiving water from the flume and discharging the same down through the spout 25 in its bottom to the bucket. The discharge-opening is controlled by a valve 26, arranged as a segment L-shaped in cross-section, of boiler-iron, with a rubber bearing-face 27. This valve swings from a pivot 28, which pivot is extended through the valve-box side and provided with a crank-arm 29, pivoted by a pin 30 to the sleeve 21.

Journaled in a fixed portion of the frame 1 is the shaft 31 of a water-wheel 32, connected by a pitman 33 with one arm of the beam 4 and receiving a constant supply of water from the flume 2 by the pipe or closed trough 34, the quantity of water supplied to the wheel being regulable by the valve 35. The shaft 31 of the water-wheel 32 also carries a fly-wheel 36.

The operation is as follows: The water being led from the flume 2 through the pipe or closed trough 34 to the wheel 32, the walking-beam is moved from the position shown in Fig. 1 until one end rises to a point immediately beneath the spout 25. During this movement the extremity of the arm 16 moves through the arc of a circle, carrying the connecting-rod 19 to the right through the sleeve 21 until the outer collar 22 strikes the end of the sleeve, when the valve is opened and the bucket quickly filled. That end of the beam then descends, the valve closing by a reverse movement, and at the same time the opposite end of the beam ascends with its bucket. When the bucket in its downward course reaches the trip 15, the lugs 14 are caught and the bucket dumped, its load of water falling into the trough 37, whence it flows into the well or reservoir 38, which supplies the pump-cylinders 7. At precisely the same moment when one bucket is dumped the ascending bucket reaches a point beneath its spout 25 and its valve is operated as before described to fill it with water. As it descends the first bucket rises, and thus in cycle. In order to prevent the face of the valve 26 from passing beyond the opening to spout 25 when it descends to close said opening, I provide a lug or guard 39, and to accelerate the speed of the valve in closing to avoid waste of water, an arm 40 is mounted on the crank-arm 29 and a weight 41 is slidably and adjustably mounted on the arm by a set-screw or any other suitable means.

It will be seen that the weight of the water alternately applied and removed at the ends of the walking-beam causes an oscillation of the beam and operation of the pumps to supply the water to distant or elevated points in a very efficient and economical manner, the water-wheel with its fly-wheel serving to carry the beam past any dead-center and as a starting medium as well as materially assisting in the continuation of the pumping.

The time at which the valves are open and closed and the extent of opening can be accurately gaged, as will be readily understood, by raising and lowering the cross-bar 17 on the arm 16 and by changing the position of the collars 22 on the rods 19.

Where desirable, the device can be arranged with two walking-beams side by side with a corresponding arrangement of valve-boxes, as shown in Fig. 3, and in other cases a single walking-beam will be sufficient, with but one set of valve-boxes arranged at one side of the flume or directly beneath the same, as will be obvious.

Wherefore, having thus fully described my invention and the manner of its operation, what I claim as new, and desire to secure by Letters Patent, is—

1. In an irrigation device, a flume, valve-boxes connected therewith and provided with outlets, a valve in each box arranged as a segment with a curved face, said valve being pivoted concentric of its curved face, a crank connected with the pivot, a walking-beam, buckets carried by the beam beneath the outlets, a connection between the beam and valve-crank to operate the valves in unison with the movement of the beam, and means for dumping the buckets.

2. In an irrigation device, a flume, valve-boxes connected therewith and provided with outlets, a valve in each box arranged as a segment U-shaped in cross-section and having a curved face, a facing of rubber on said valve, said valve being pivoted concentric of its curved face, a crank connected with the pivot, a walking-beam, buckets carried by the beam beneath the outlets, a connection between the beam and valve-crank to operate the valves in unison with the movement of the beam, and means for dumping the buckets.

3. In an irrigation device, a flume, a valve-box connected therewith and provided with an outlet, a valve in the box arranged as a segment with a curved face, said valve being pivoted concentric of its curved face, a crank connected with the pivot, an arm mounted on the crank, a weight slidably and adjustably mounted on the arm, and means connected with the crank whereby the valve is operated to open or close the outlet.

4. In an irrigation device, a flume, valve-boxes connected therewith and provided with outlets, a valve in each box arranged as a segment with a curved face, said valve being pivoted concentric of its curved face, a crank connected with the pivot, an arm mounted on the crank, a weight slidably and adjustably mounted on the arm, a walking-beam, a pump operated thereby, buckets carried by the pump beneath the outlets, a connection between the beam and valve-crank to operate the valves in unison with the movement of the beam, and means for dumping the buckets.

5. In an irrigation device, a flume, valve-boxes connected therewith and provided with outlets, a valve in each box arranged as a segment with a curved face, said valve being pivoted concentric of its curved face, a crank connected with the pivot, an arm mounted on the crank, a weight slidably and adjustably mounted on the arm, a walking-beam, buckets carried by the beam beneath the outlets, a connection between the beam and valve-crank to operate the valves in unison with the movement of the beam, and means for dumping the buckets.

6. In an irrigation device, a flume, valve-boxes connected therewith and provided with outlets, a valve in each box arranged as a segment with a curved face, said valve being pivoted concentric of its curved face, a crank connected with the pivot, a sleeve pivoted to the crank, a walking-beam, buckets swung at the ends of the beam beneath the outlets, lugs carried by the buckets, trips arranged to engage the lugs and dump the descending buckets, a trough arranged to catch and convey the dumped water to a reservoir, a pump arranged to take water from the reservoir and to discharge it at a distance, and rods connecting the pistons of the pump with the walking-beam.

7. In an irrigation device, a flume, valve-boxes connected therewith and provided with outlets, a valve in each box arranged as a segment with a curved face, said valve being pivoted concentric of its curved face, a crank connected with the pivot, an arm mounted on the crank, a weight slidably and adjustably mounted on the arm, a walking-beam, buckets carried by the beam beneath the outlets, lugs carried by the buckets, trips arranged to engage the lugs and dump the descending buckets, a trough arranged to catch and convey the dumped water to a reservoir, a pump arranged to take water from the reservoir and to discharge it at a distance, and rods connecting the pistons of the pump with the walking-beam.

8. In an irrigation device, a flume, valve-boxes connected therewith and provided with outlets, a valve in each box arranged as a segment with a curved face, said valve being pivoted concentric of its curved face, a crank connected with the pivot, a sleeve pivoted to the crank, a walking-beam, a rod extending through the sleeve and connecting the crank and walking-beam, buckets swung at the ends of the beam beneath the outlets, collars adjustably secured to the rod at each side of the sleeve, lugs carried by the buckets, and trips arranged to engage the lugs and dump the buckets.

9. In an irrigation device, a flume, valve-boxes connected therewith and provided with outlets, a valve in each box arranged as a segment with a curved face, said valve being pivoted concentric of its curved face, a crank connected with the pivot, a sleeve pivoted to the crank, a walking-beam, buckets swung at the ends of the beam beneath the outlets, an arm extending upwardly from the axis of the beam, a cross-bar adjustably fixed on the arm, a connecting-rod pivoted at one end to the cross-bar with its other end passing through the sleeve, collars adjustably secured to the rod at each side of the sleeve, lugs carried by the buckets, trips arranged to engage the lugs and dump the descending buckets, a trough to catch and convey the dumped water to a reservoir, a pump arranged to take its water from the reservoir and to discharge at a distance, and rods connecting the pistons of the pump with the walking-beam.

In testimony whereof I hereunto affix my signature in presence of two witnesses.

IRA G. MITCHELL.

Witnesses:
 THOS. SHERVIN,
 A. C. MOULTON.